US012331647B2

(12) United States Patent
Servant et al.

(10) Patent No.: US 12,331,647 B2
(45) Date of Patent: Jun. 17, 2025

(54) SYSTEM FOR CONTROLLING THE PITCH SETTING OF A PROPELLER VANE FOR AN AIRCRAFT TURBINE ENGINE

(71) Applicant: SAFRAN AIRCRAFT ENGINES, Paris (FR)

(72) Inventors: Régis Eugène Henri Servant, Moissy-Cramayel (FR); Clément Cottet, Moissy-Cramayel (FR); Laurent Jablonski, Moissy-Cramayel (FR); Jean-Claude Christian Taillant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/686,008

(22) PCT Filed: Aug. 31, 2021

(86) PCT No.: PCT/FR2021/051500
§ 371 (c)(1),
(2) Date: Feb. 23, 2024

(87) PCT Pub. No.: WO2024/031522
PCT Pub. Date: Feb. 23, 2024

(65) Prior Publication Data
US 2025/0035009 A1    Jan. 30, 2025

(51) Int. Cl.
*F01D 25/28* (2006.01)
*B64C 11/06* (2006.01)
(Continued)

(52) U.S. Cl.
CPC .............. *F01D 17/10* (2013.01); *B64C 11/06* (2013.01); *B64C 11/30* (2013.01); *F01D 25/28* (2013.01);
(Continued)

(58) Field of Classification Search
CPC ......... F01D 17/10; F01D 25/28; B64C 11/06; B64C 11/30; F05D 2230/60; F05D 2260/31
See application file for complete search history.

(56) References Cited

U.S. PATENT DOCUMENTS 4,850,801 A * 7/1989 Valentine ................ F16C 25/06
416/147
2013/0094943 A1* 4/2013 Bouru .................... F04D 29/056
415/170.1
(Continued)

FOREIGN PATENT DOCUMENTS

FR    2 942 454 A1    8/2010
FR    3 017 163 A1    8/2015
(Continued)

OTHER PUBLICATIONS

International Search Report mailed May 10, 2022, issued in corresponding International Application No. PCT/FR2021/051500, filed Aug. 31, 2021, 5 pages.
(Continued)

*Primary Examiner* — Elton K Wong
*Assistant Examiner* — Theodore C Ribadeneyra
(74) *Attorney, Agent, or Firm* — CHRISTENSEN O'CONNOR JOHNSON KINDNESS PLLC

(57) ABSTRACT

A system for controlling the pitch setting of a propeller blade for an aircraft turbine engine, includes a blade having a vane connected to a root. A hub accommodates the root of the blade, and a ring is mounted around the root and in the hub. Stops are also mounted around the root and in the hub. A nut is threadedly engaged with a thread of the ring and is configured to bear axially against the hub to secure the assembly.

19 Claims, 16 Drawing Sheets

(51) Int. Cl.
*B64C 11/30* (2006.01)
*F01D 17/10* (2006.01)
(52) U.S. Cl.
CPC ...... *F05D 2230/60* (2013.01); *F05D 2260/31* (2013.01)

(56) References Cited

U.S. PATENT DOCUMENTS

2015/0330233 A1* 11/2015 Petellaz ................ F04D 29/322
    29/889.7
2019/0010957 A1* 1/2019 Belmonte ............... B64C 11/06

FOREIGN PATENT DOCUMENTS

| FR | 3 080 322 A1 | 10/2019 |
| WO | 2010/116080 A1 | 10/2010 |
| WO | 2020/169896 A1 | 8/2020 |

OTHER PUBLICATIONS

Written Opinion mailed May 10, 2022, issued in corresponding International Application No. PCT/FR2021/051500, filed Aug. 31, 2021, 6 pages.

\* cited by examiner

SYSTEM FOR CONTROLLING THE PITCH SETTING OF A PROPELLER VANE FOR AN AIRCRAFT TURBINE ENGINE

FIELD OF THE DISCLOSURE

The present disclosure relates to the field of the aircraft turbine engines and in particular to the propulsion propellers of these turbine engines which comprise variable pitch vanes.

BACKGROUND

The prior art comprises in particular the documents FR-A1-3 017 163 and FR-A1-3 080 322.

An aircraft turbine engine propeller can be ducted, as in the case of a fan for example, or un-ducted, as in the case of an open-rotor architecture for example.

A propeller comprises vanes which may be pitch variable. The turbine engine then comprises a mechanism allowing for changing the pitch angle of the vanes in order to adapt the thrust generated by the propeller to different phases of flight.

The design of a propeller vane involves several disciplines with generally conflicting objectives. It must allow optimal aerodynamic performance (i.e. provide a thrust while maximising the efficiency), guarantee a mechanical strength of the vane (i.e. withstand the mechanical constraints resulting from static and dynamic loadings) while limiting the mass and the acoustic signature. In particular, the improvement in the aerodynamic performance of the propeller tends towards an increase of the BPR (By Pass Ratio), which translates into an increase in its external diameter and therefore in the span of the vanes. Increasing the BPR goes hand in hand with reducing the FPR (Fan Pressure Ratio). Therefore, a pitch change system (variable pitch vane) is usually required to make the propeller operable throughout the flight domain.

There are several technologies for attaching a variable pitch propeller vane and several technologies for controlling the pitch setting of such a propeller vane. However, these technologies are relatively complex and expensive. Furthermore, in the event of a problem, and in particular breakage, they do not guarantee that the vanes are retained radially outwards in relation to the axis of rotation of the propeller, particularly when this propeller is not ducted.

In the event of failure of the retention means of a vane of the propeller, it is particularly important to ensure that this vane is retained to prevent it from being thrown outwards and impacting the fuselage of the aircraft equipped with the turbine engine. This safety function, referred to as "failsafe", is not always present in the control systems of the current technologies. The control systems that comprise this function typically comprise elements that are themselves susceptible to detachment and impact on the fuselage of the aircraft. The greater the size and density of these elements, the greater the risk of damage to the fuselage and the greater the need for special shielding, which impacts on the mass of the aircraft and therefore its performance.

There is therefore a need for a control system technology that integrates a simple and effective safety function.

SUMMARY

The disclosure relates to a system for controlling the pitch setting of a propeller vane, for an aircraft turbine engine, characterised in that it comprises:

- a vane comprising a blade connected to a root, the vane comprising a pitch axis and its root comprising a bulb which has two bearing surfaces, a lower bearing surface and an upper bearing surface respectively, which extend around the axis,
- a hub comprising an annular wall extending around the axis, this annular wall comprising a lower axial end closed by a bottom wall, and an upper axial end which is open and configured to allow the root of the vane to be mounted inside the hub, the bottom wall comprising a recess having a non-circular cross-section and configured to receive a free end of complementary shape to the root so that the hub is secured in rotation with the root around the axis,
- a ring which extends around the axis and which is mounted around the root and in the hub, this ring comprising a lower wall which is situated in the hub and which comprises an aperture through which the free end of the root passes, the lower bearing surface of the bulb of the root being configured so as to bear, at least in the axial direction, on this lower wall, on the side opposite the blade of the vane, the ring further comprising a perforated intermediate wall and a thread at an upper end,
- abutments which are arranged around the axis and which are mounted around the root and in the hub, these abutments being engaged in openings in the intermediate wall and in at least one housing in the annular wall of the hub, the upper bearing surface of the bulb of the root being configured so as to bear, at least in the axial direction, on these abutments, on the blade side of the vane, and
- a nut screwed onto the thread of the ring and configured to bear axially on the hub so that tightening the nut forces the lower wall of the ring to bear on the lower bearing surface of the bulb of the root, the upper bearing surface of this bulb to bear on the abutments, and these abutments to bear on complementary support surfaces of the at least one housing of the hub.

In the pitch system described in the disclosure, it is the hub in which the root of the vane is mounted that is configured to be moved in rotation about the pitch axis and that drives the vane in this movement. To achieve this, the root of the vane is secured in rotation to the hub, which thus forms a pivot link for the vane.

The pitch setting system comprises a ring, abutments and a nut, and this assembly allows to perform several functions. It allows the root of the vane to be assembled and disassembled from the hub without having to disassemble the hub. This assembly and this disassembly can be carried out from the outside, which, in the case of an unducted propeller, can allow vane to be disassembled and removed without the need to remove the turbine engine, which can remain attached to a wing of the aircraft, for example. The abutments provide a failsafe function. If, for example, one of these abutments were to crack or break, the other abutments would hold the vane root in place until the damaged abutment was replaced. The tightening of the nut also allows to apply a radial preload to the root of the vane, allowing to ensure that the vane is immobilised and retained. This preload is advantageously predetermined so that it is not totally compensated by the forces induced by the centrifugal forces, the aerodynamic forces and the moments applied to the vane during the operation and the rotation of the propeller.

The system according to the disclosure may comprise one or more of the following characteristics, taken alone or in combination with each other:
- the number of abutments is less than or equal to the number of openings in the intermediate wall of the ring, each of the abutments being engaged in one of these openings;
- the number of abutments is between 5 and 20, and preferably between 7 and 11;
- the lower wall of the ring is generally frustoconical in shape flared towards the blade so that the bearing of the lower bearing surface of the bulb of the root on this lower wall has at every point an axial component and a radial component with respect to the axis;
- each of the abutments comprises a bearing face on the upper bearing surface of the bulb of the root, this bearing face being shaped so that the bearing has at any point an axial component and a radial component with respect to the axis;
- the nut is screwed onto the outside of the ring and/or bears axially on an upper free end of the hub;
- each of the abutments comprises at least one finger projecting radially outwards with respect to the axis, the at least one finger comprising an upper face bearing axially on a corresponding support surface of the at least one housing;
- the at least one finger also comprises a lateral face bearing radially outwards on a corresponding support surface of the at least one housing;
- each of the abutments comprises two fingers projecting radially outwards with respect to the axis and arranged axially one behind the other;
- the hub comprises at least one annular rib which extends around the axis and which defines the at least one housing for engaging the abutments, this rib comprising at least one axial notch configured to allow the abutments to be mounted one after the other.
- the hub comprises two annular ribs, an upper rib and a lower rib respectively, which extend around the axis and which define between them the at least one housing for engaging the abutments, these ribs comprising at least one axial notch configured to allow the abutments to be mounted one after the other;
- the system further comprises at least one bolt which is engaged in one of the openings in the ring and in the at least one notch, the bolt being attached to the ring;
- the bolt is attached to the ring by one or more screws;
- the bolt is located on the side of a suction side of the blade of the vane, and is closer to a trailing edge of the blade than to its leading edge;
- before mounting the bolt, the ring is able to move in rotation about the axis in the hub, and after mounting the bolt, the ring is prevented from rotating about this axis by circumferential abutment of the bolt on the sides of the notch;
- one of the abutments forms a bolt;
- the bolt is independent of the abutments;
- the root or the bulb of the root is solid (i.e. it is free of hollowed-out portion);
- the number of openings in the intermediate wall of the ring is between 5 and 20, and preferably between 8 and 12;
- the system further comprises:
  - a guide bearing with a lower rolling extending around the axis and mounted around a lower portion of the hub;
  - a guide bearing with an upper rolling extending around the axis and mounted around an upper portion of the hub;
- at least one of the guide bearings has its internal ring integrated into the hub;
- at least one of the guide bearings is angular contact;
- the recess is eccentric with respect to the pitch axis.

The guide bearings take up the mechanical actions resulting from the aerodynamic and centrifugal forces applied to the vane during operation. The lower bearing can be configured to ensure the centrifugal retention of the vane and the upper bearing can be configured to take up the bending moment resulting from aerodynamic and centrifugal forces. The distance between the bearings along the pitch axis generates a sufficient leverage to prevent the vane from swivelling in any phase of flight.

The present disclosure also relates to a turbine engine, in particular an aircraft, comprising at least one system as described above.

The present disclosure finally relates to a method for mounting a system as described above, wherein it comprises the steps of:
a) inserting the ring into the hub,
b) inserting the root of the vane into the ring until the lower bearing surface of the bulb of the root bears against the lower wall of the ring,
c) engaging the abutments in the openings in the intermediate wall of the ring and in the at least one housing of the hub, and
d) screwing the nut onto the ring and tightening the nut on the hub so as to force the lower wall of the ring to bear on the lower bearing surface of the bulb of the root, the upper bearing surface of this bulb to bear on the abutments, and these abutments to bear on the complementary support surfaces of the at least one housing of the hub.

Advantageously, step c) comprises the following successive sub-steps:
c1) engaging one of the abutments in one of the openings in the intermediate wall of the ring, by moving the abutment in axial translation through the notch in the hub,
c2) moving in rotation the ring and the abutment inside the hub, around the axis,
c3) engaging another of the abutments in one of the openings in the intermediate wall of the ring, by moving the abutment in axial translation through the notch in the hub,
c4) moving in rotation the ring and the abutments inside the hub, around the axis,
c5) repeating steps c3) and c4) for the remaining abutments,
c6) engaging the bolt in the last free opening in the intermediate wall of the ring, by moving the bolt in axial translation through the notch in the hub, and
c7) attaching the bolt to the ring.

In one embodiment, the ring is moved by one circumferential pitch in each of steps c2) and c4), this circumferential pitch being equal to $360°/k$, k being the number of openings in the intermediate wall of the ring.

DESCRIPTION OF THE DRAWINGS

Further characteristics and advantages will be apparent from the following description of a non-limiting embodiment of the disclosure with reference to the appended drawings in which.

DETAILED DESCRIPTION

Figure 1:
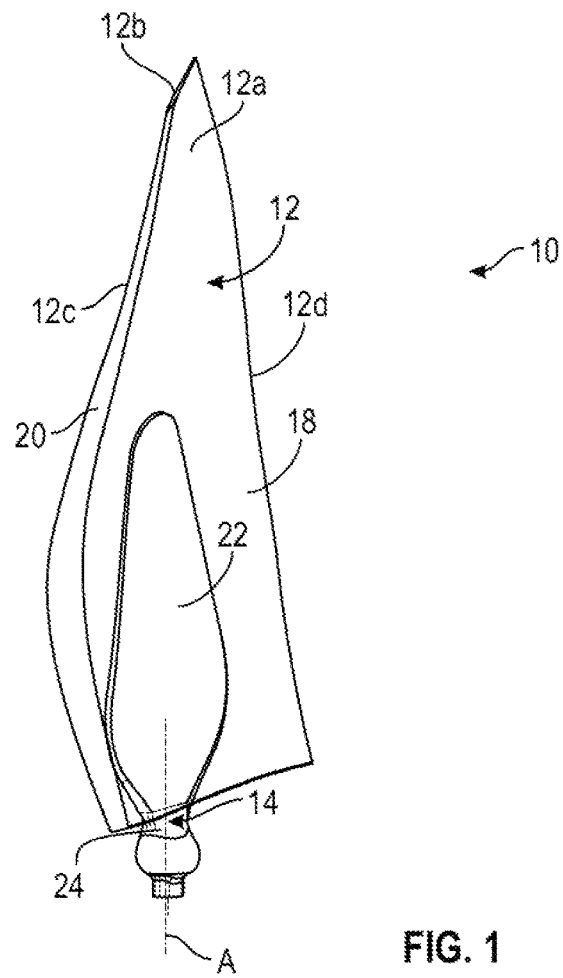
FIG. 1 is a schematic perspective view of a propeller vane for an aircraft turbine engine.

FIG. 1 shows a vane 10 for a propeller of an aircraft turbine engine, this propeller being either ducted or un-ducted.

The vane 10 comprises a blade 12 connected to a root 14.

The blade 12 has an aerodynamic profile and comprises a pressure side 12a and a suction side 12b which are connected by an upstream leading edge 12c and by a downstream trailing edge 12d, the terms upstream and downstream referring to the gas flow around the blade in operation.

The blade 12 has an upper end which is free, referred to as top, and a lower end which is connected to the root 14.

In the example shown, the vane 10 is made of a composite material by an injection method referred to as RTM method (Resin Transfer Molding). This method consists of preparing a fibrous preform 18 by three-dimensional weaving, then placing this preform in a mould and injecting a polymerizable resin, such as an epoxy resin, which will impregnate the preform. After the blade 12 has polymerized and hardened, its leading edge 12c is usually reinforced by a metallic shield 20 which is fitted and attached, for example by gluing.

The vane 10 here comprises a spar 22 which comprises a portion forming a web of the blade 12 and which is intended to be inserted into the preform 18 prior to the resin injection, and a portion which extends from the side opposite the summit of the blade 14 to form a portion of the root 14, referred to as body 24.

The spar 22 is preferably made of a 3D woven carbon fibre reinforced epoxy organic matrix composite material with the warp direction predominantly radial oriented and the weft predominantly oriented along the chord of the blade at aerodynamic vein height. However, the spar can also be a more mechanically advantageous assembly of different organic matrix composite materials (thermoset, thermoplastic or elastomer) reinforced with long fibres (carbon, glass, aramid, polypropylene) in different fibrous arrangements (woven, braided, knitted, unidirectional).

Although not shown, the blade 12 may be hollow or solid and comprises an internal cavity filled with a foam or honeycomb type filler material. This filler material is installed around the spar 22 and is covered with a skin of organic matrix composite material to increase the impact resistance of the blade.

The shield 20 may be titanium or titanium alloy, stainless steel, steel, aluminium, nickel, etc. The pressure side 12a or even the suction side 12b of the blade 12 may be covered with a polyurethane film for the protection against erosion.

A is the axis of elongation of the vane 10 and of the blade 12 and in particular the pitch axis for adjusting the pitch of the vane 10, i.e. the axis about which the angular position of the vane is adjusted. It is usually also a radial axis and therefore extends along a radius from the axis of rotation of the propeller equipped with this vane.

Figure 3:
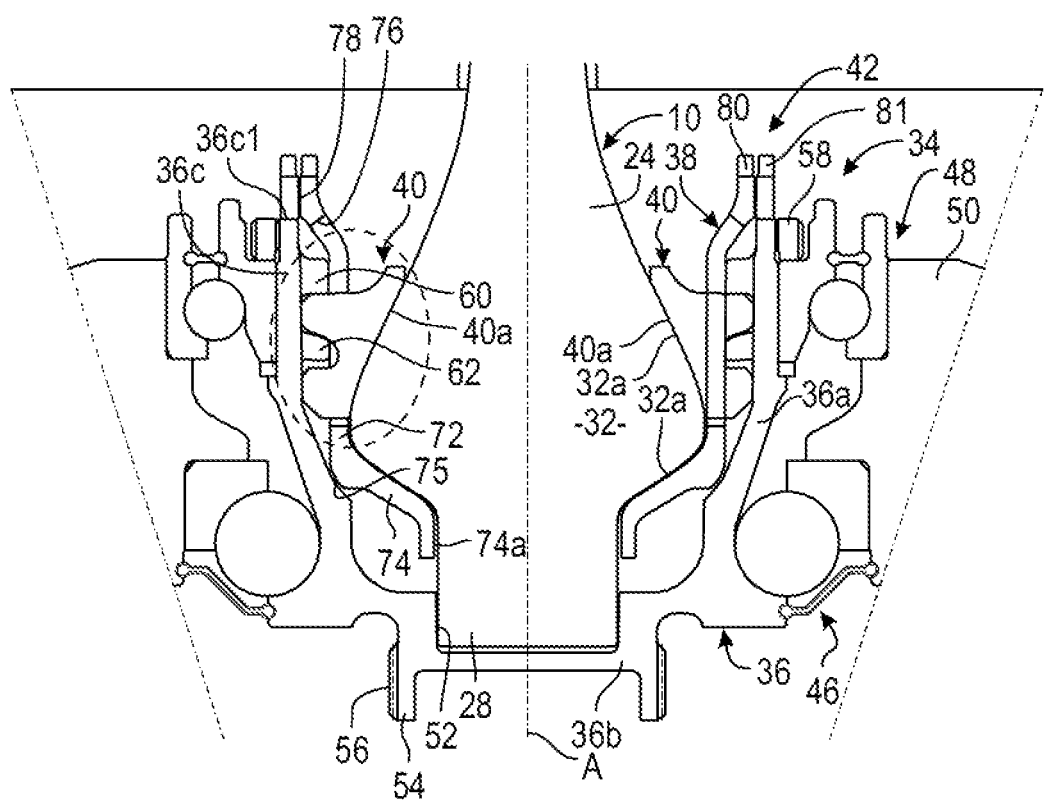
FIG. 3 is a schematic view in axial cross-section of a system according to the disclosure for the angular pitch setting of a turbine engine propeller vane, according to a first embodiment of the disclosure.

The body 24 of the root 14 has a particular shape that can be seen more clearly in FIG. 3.

The body 24 essentially comprises three portions:
a free end 28 located on the opposite side to the blade 12,
a stilt 30 on the side of the blade 12, and
a bulb 32 located between the free end 28 and the stilt 30.

The free end 28 has a generally parallelepiped shape in the example shown. This end 28 is preferably misaligned or offset with respect to the axis A in order to carry out a keying or indexing, as will be explained in more detail below.

The stilt 30 may have a relatively complex shape and may be considered to comprise:
two lateral flanks 30a, 30b, located respectively on the pressure side 12a and of the suction side 12b of the blade 12, which converge towards each other along the axis A and in the direction of the summit of the blade 12, and
two edges, respectively upstream 30c and downstream 30d, which diverge from each other along the axis A and towards the summit of the blade 12.

The bulb 32 has a generally bulged or domed shape, this bulging or doming extending around the axis A.

The bulb 32 has two peripheral bearing surfaces, lower 32a and upper 32b respectively, which extend around the axis A. In the example shown, because of the shape of the bulb, the lower bearing surface 32a faces downwards (i.e. on the opposite side of the blade 12) and radially outwards with respect to the axis A, and the upper bearing surface 32b faces upwards (i.e. towards the blade 12) and radially outwards with respect to the axis A.

Figure 2:
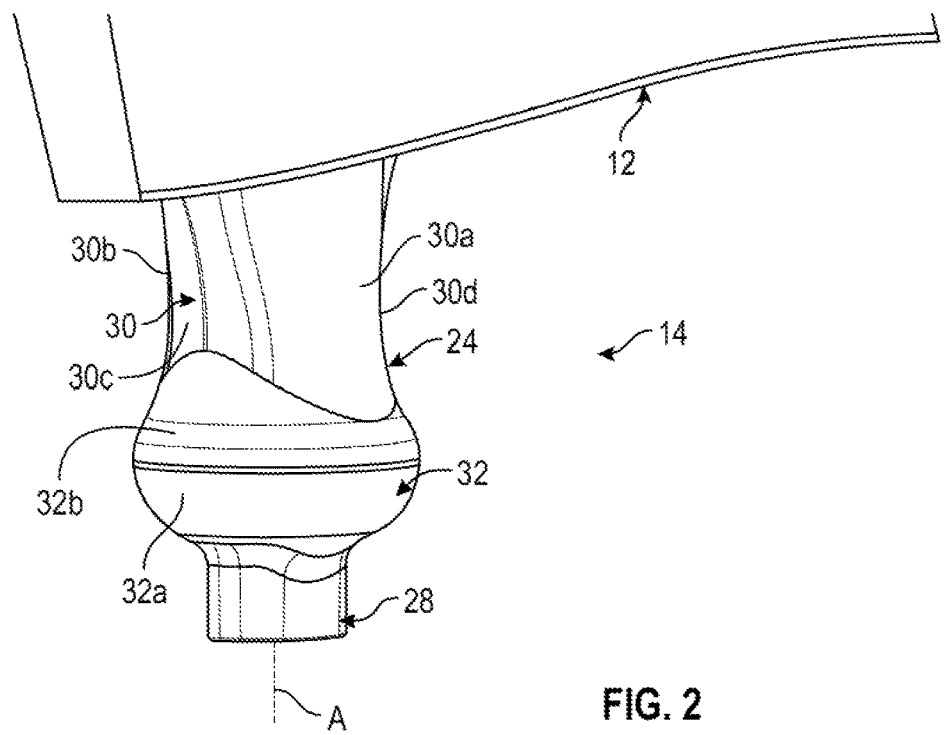
FIG. 2 is a larger scale view of a portion of FIG. 1 and shows the root of the vane.

FIGS. 3 to 16 illustrate a first embodiment of a system 34 according to the disclosure for angular pitch setting of a vane 10 as illustrated in FIGS. 1 and 2.

The system 34 essentially comprises a hub 36, a ring 38, abutments 40 and a nut 42.

Figure 4:
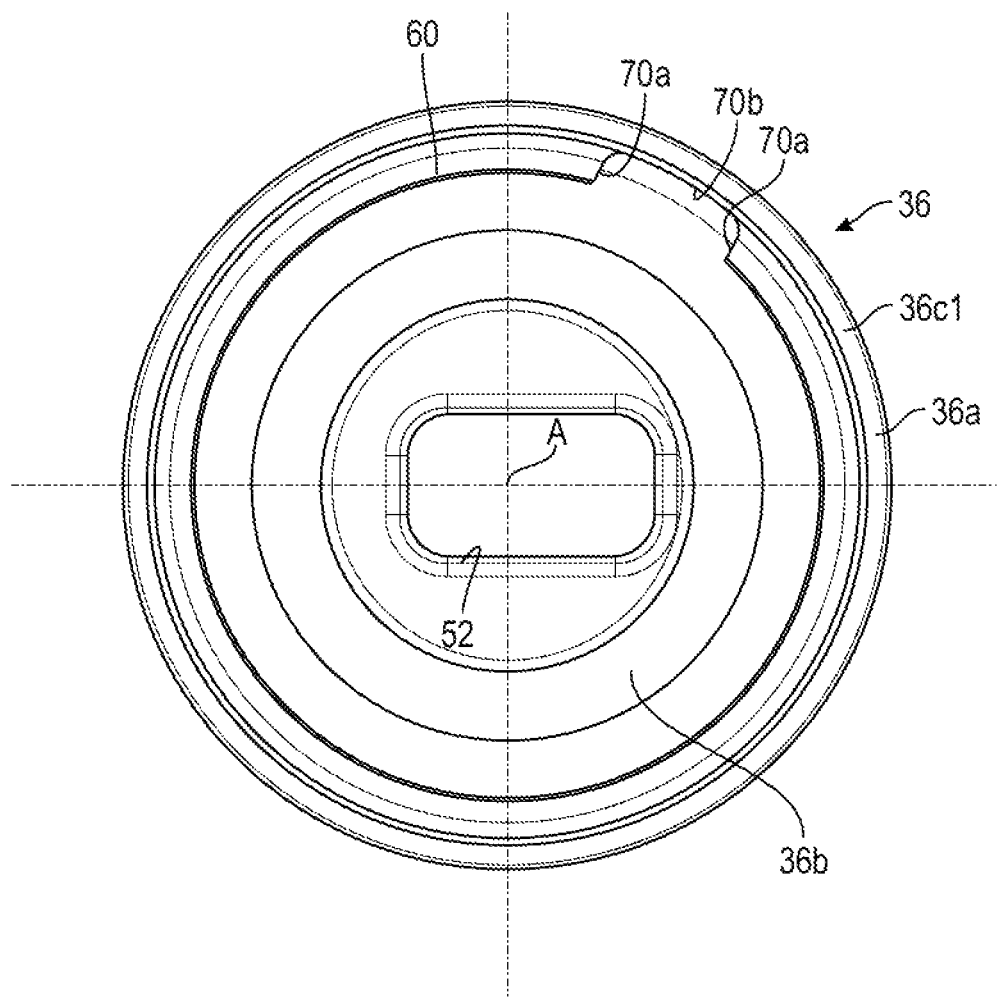
FIG. 4 is a schematic view of a hub from the system in FIG. 3, seen from above.
Figure 5:
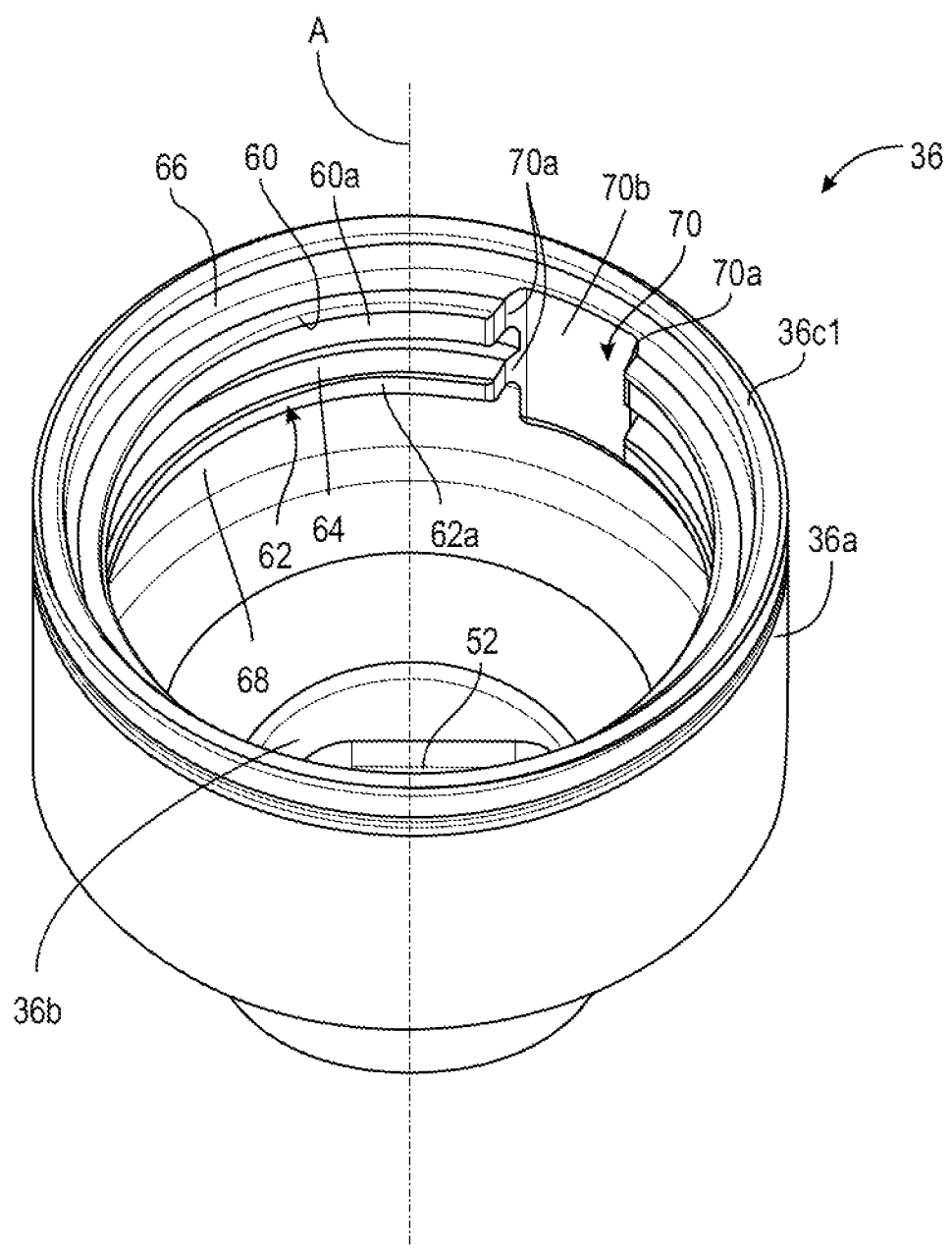
FIG. 5 is a schematic perspective view of the hub of the system shown in FIG. 3.

The hub 36 is shown on its own in FIGS. 4 and 5. The ring 38 is shown on its own in FIG. 6. The abutments 40 are preferably identical and one of these abutments 40 is shown in FIG. 7. The nut 42 can be seen in FIGS. 3 and 9 to 14 in particular.

FIGS. 3, 8 and 13-15 show other elements of the system 34 which are, however, optional. This is particularly the case for the bolt 44 and the rolling bearings 46 and 48.

The bearings 46, 48 are mounted around the hub 36, between the hub 36 and a casing 50 of the turbine engine, which may be a hubset of the propeller. The bearings 46, 48 are here two in number and are respectively a lower bearing 46 and an upper bearing 48.

The bearings 46, 48 are of the rolling bearing with balls. In the example shown, they have different diameters and their balls also have different diameters.

The bearing 46 extends substantially around the lower bearing surface 32a and/or the free end 28 of the root 14 in the example shown. This bearing 46 has a smaller diameter than the other bearing 48, and theirs balls have a larger diameter than those of the other bearing 48.

The bearing 46 has angled contact. In the example shown, the support points or surfaces of the balls on the raceways of their rings are located on a frustoconical surface which extends along the axis A and whose largest diameter is located on the side of the summit of the vane.

The bearing 48 extends substantially around the upper bearing surface 32b of the root 14. The bearing 48 has angled contact. In the example shown, the support points or surfaces of the balls on the raceways of their rings are located on a frustoconical surface which extends along the axis A and whose largest diameter is located on the side of the free end of the root of the vane.

The casing 50 carries the external rings of the bearings 46, 48 and their internal rings are carried by the hub 36 or integrated into the latter, as is the case with the internal ring of the bearing 46 in the example shown.

The bearings 46, 48 ensure that the hub 36 is centered and guided around the axis A with respect to the casing 50. The hub 36 therefore acts as a pivot for the vane 10, relative to the casing 50.

The hub 36 comprises an annular wall 36a extending around the axis A. This wall 36a comprises a lower axial end closed by a bottom wall 36b, and an upper axial end that is open and configured to allow the root 14 of the vane 10 to be mounted inside the hub 36. It is assumed here that the axis A of the hub 36 is that of the vane 10, corresponding to the axis of the rotation for the pitch setting change of the vane, substantially radially with respect to the rotation of the propeller.

The bottom wall 36b is configured to cooperate in a form-fitting manner with the free end of the root 14, and therefore with the end 28 of the body 24, so that the hub 36 is secured against rotation with the root 12 about the axis.

In the present case, it is understood that the bottom wall 36b comprises a recess 52 having a non-circular, and in particular rectangular, cross-section and configured to receive the end 28 (FIG. 3). As can be seen in FIG. 4, this recess 52 is eccentric with respect to the axis A in a similar way to the end 28. This eccentricity allows an indexing and a keying when inserting and mounting the root 12 into the hub 36, with only one engagement position of the end 28 in the recess 52 being possible.

The recess 52 is located on an upper or internal face of the bottom wall 36b of the hub 36, which is therefore located inside the hub 36 and facing the side of the root 12.

The system 34 generates a torque at the vane root that counteracts the torsional moment resulting from the aerodynamic and centrifugal forces. The transmission of the forces between the hub 36 and the root 12 is direct, with the torsional moment being applied directly to the body of the root.

The bottom wall 36b comprises a lower or external face, which is located on the side opposite the root 14, and which comprises a cylindrical extension 54 extending along the axis A and comprising an external thread or external rectilinear splines 56 for the rotational coupling of the system with a pitch change mechanism which is not illustrated and which is common to the various systems 34 and vanes 10 of the propeller (see FIG. 3).

The external periphery of the wall 36a of the hub 36 comprises a raceway on which the balls of the bearing 46 roll directly. This raceway comprises an annular surface with a concave curved section. This raceway is located at the lower end of the hub 36 and of the wall 36a.

The internal ring of the bearing 48 is engaged on and around the free upper end 36c of the hub 36 and of the wall 36a. This end of the wall 36a comprises an external cylindrical surface for mounting this internal ring and an external thread for screwing on a nut 58 designed to bear axially on the internal ring of the bearing 48 to hold it tightened axially against an external cylindrical shoulder of the hub 36.

The free upper end 36c of the hub 36 comprises a surface 36c1 which extends in a plane perpendicular to the axis A (FIGS. 3 to 5).

In the example shown, the wall 36a of the hub 36 comprises two annular ribs 60, 62 at its internal periphery, which extend around the axis A and are therefore coaxial. The ribs 60, 62 are arranged at an axial distance from each other and one above the other, and are therefore upper 60 and lower 62 ribs respectively.

The upper rib 60 ensures the radial retention of the abutments 40 and therefore of the root 14 of the vane 10, and the rib 62 forms a redundancy of these retention means and ensures the failsafe function of the assembly.

The ribs 60, 62 define between them a first annular housing 64 which extends around the axis A. Furthermore, the upper rib 60 can be considered as defining another housing 66, referred to as the upper housing, located above the rib 60, and the lower rib 62 can also be considered as defining another housing 68, referred to as the lower housing, located below the rib 62 (FIGS. 3 and 5).

The ribs 60, 62 extend continuously over less than 360° because they are interrupted by at least one axial notch 70, as can be seen in FIGS. 4 and 5. The notch 70, for example, has an angular extent around the axis A of between 20° and 60°, and preferably between 30° and 50°. The ribs 60, 62 therefore each preferably have an angular extent around the axis A of between 300 and 340°, and preferably between 310 and 330°.

The notch 70 comprises side walls 70a facing each other and connected by a bottom wall 70b facing the axis A.

Figure 3A:
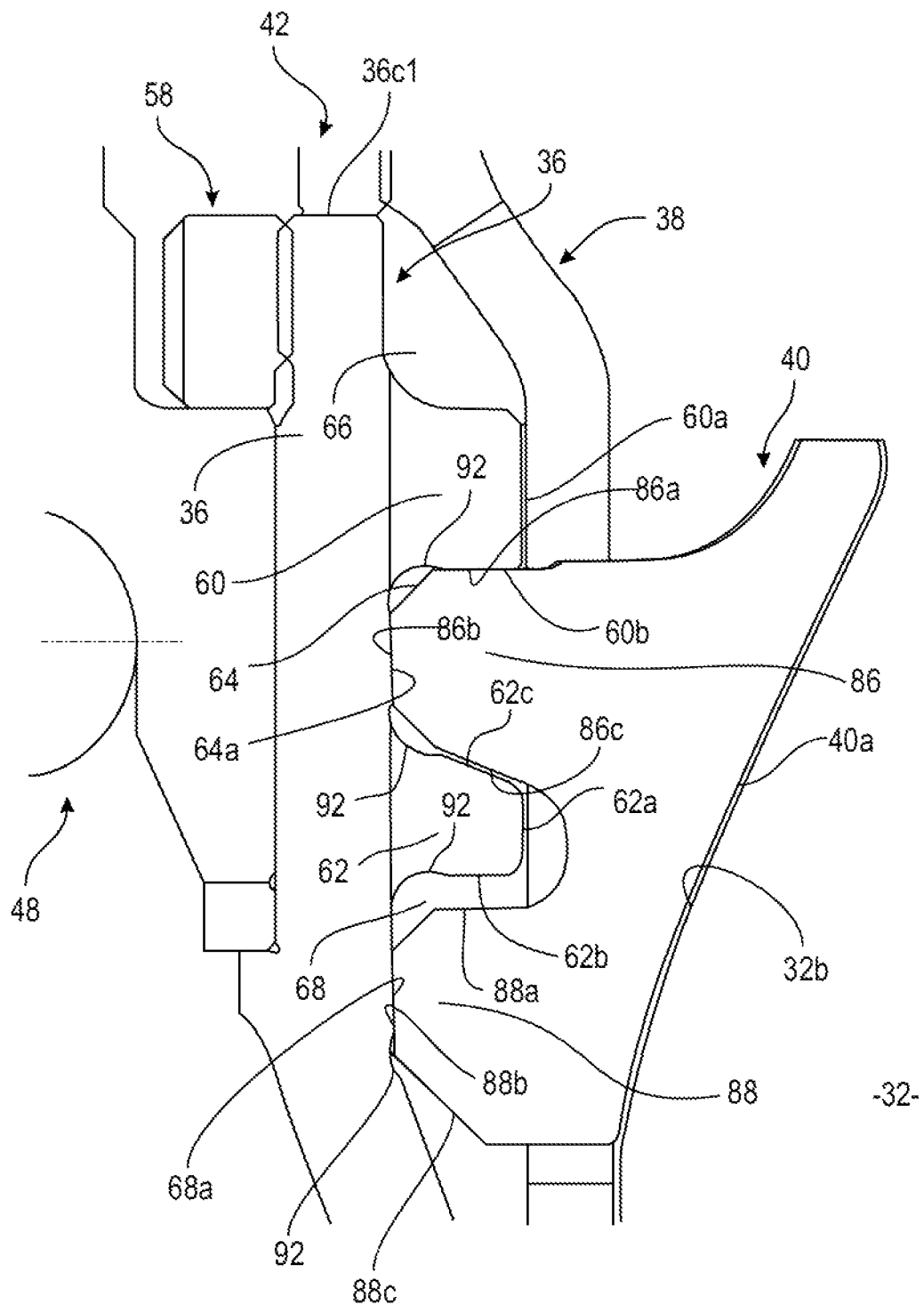
FIG. 3a is a larger scale detail view of a portion of FIG. 3.

As can be seen in FIG. 3a, the upper rib 60 comprises at its internal periphery an internal cylindrical surface 60a and at its lower end an annular surface 60b extending in a plane perpendicular to the axis A.

The lower rib 62 comprises at its internal periphery an internal cylindrical surface 62a, at its lower end an annular surface 62b extending in a plane perpendicular to the axis A, and at its upper end a frustoconical surface 62c flared towards the side of the blade 12 of the vane 10.

Between the ribs 60, 62, the housing 64 comprises an internal cylindrical surface 64a at the bottom. The housing 68 comprises an internal cylindrical surface 68a at the bottom.

The ring 38 comprises a generally cylindrical intermediate wall 72 which is connected at its lower end to a lower annular wall 74.

The intermediate wall 72 is perforated and comprises through-openings 76. In the example shown, the wall 72 comprises an annular row of openings 76 which are identical and regularly spaced and distributed around the axis A.

The openings 76 are configured to allow the abutments 40 to be mounted and are therefore sized accordingly. In addition, the number of openings 76 is at least equal to the number of abutments 40 so that each of the abutments 40 can be mounted in one of these openings 76.

The openings 76 have a generally rectangular shape and are generally elongated along the axis A. The openings 76 are separated from each other by columns 72a in the wall 72. The columns 72a are straight and parallel to each other and to the axis A.

The lower wall 74 comprises a central orifice 74a through which the lower end 28 of the root of the vane passes, as can be seen in FIG. 3.

The wall 74 is configured to support the lower bearing surface 32a of the bulb 32 of the root 14 of the vane 10. As can be seen in FIG. 3, the wall 74 is preferably shaped to match the shape of the bulb 32 and of this bearing surface 32a. The wall 32 is generally frustoconical in shape and flares out towards the blade 12 of the vane 10.

Figure 6:
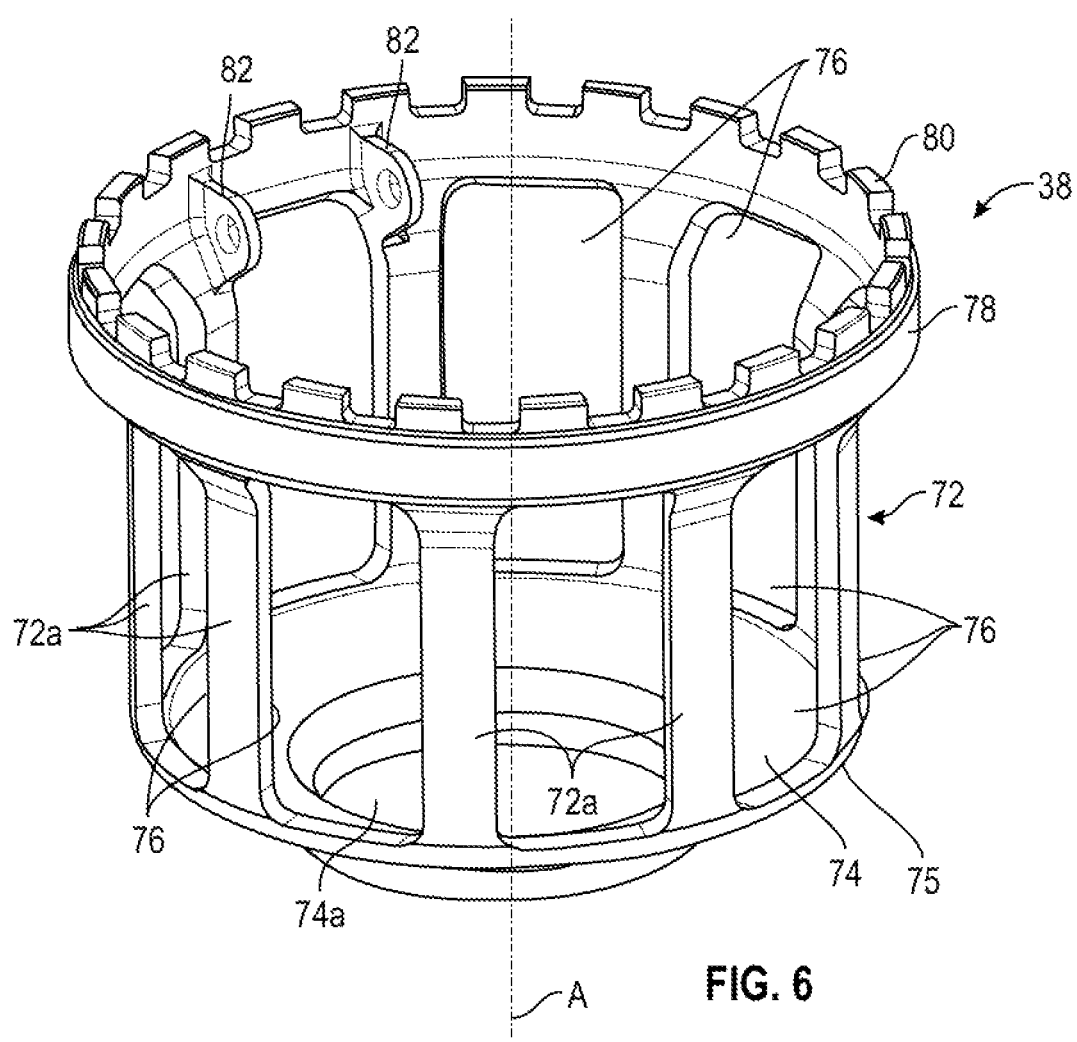
FIG. 6 is a schematic perspective view of a ring in the system shown in FIG. 3.
Figure 7:
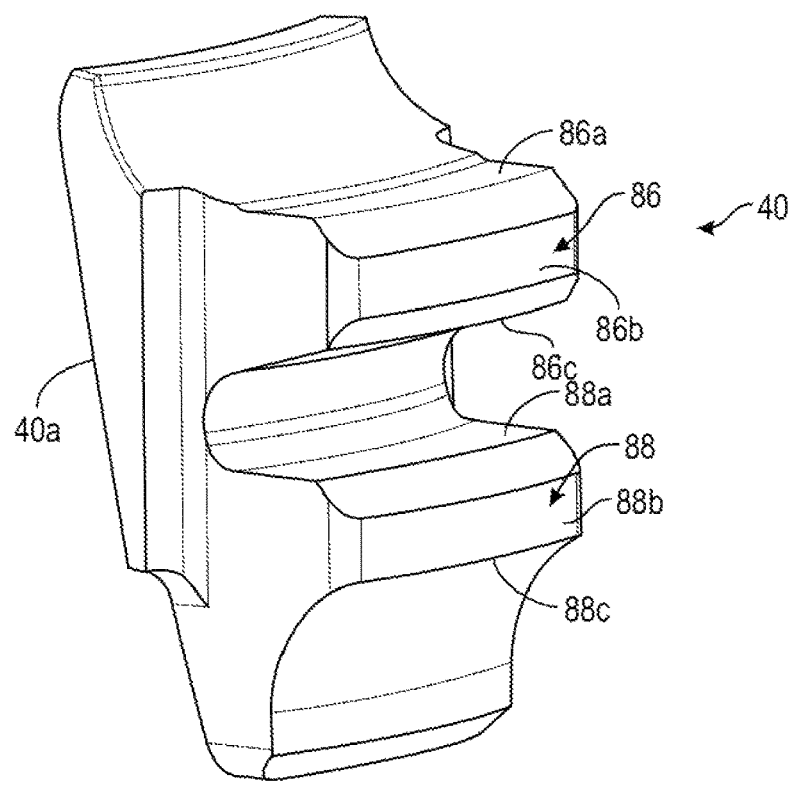
FIG. 7 is a schematic perspective view of a abutment of the system shown in FIG. 3, seen from above.
Figure 8:
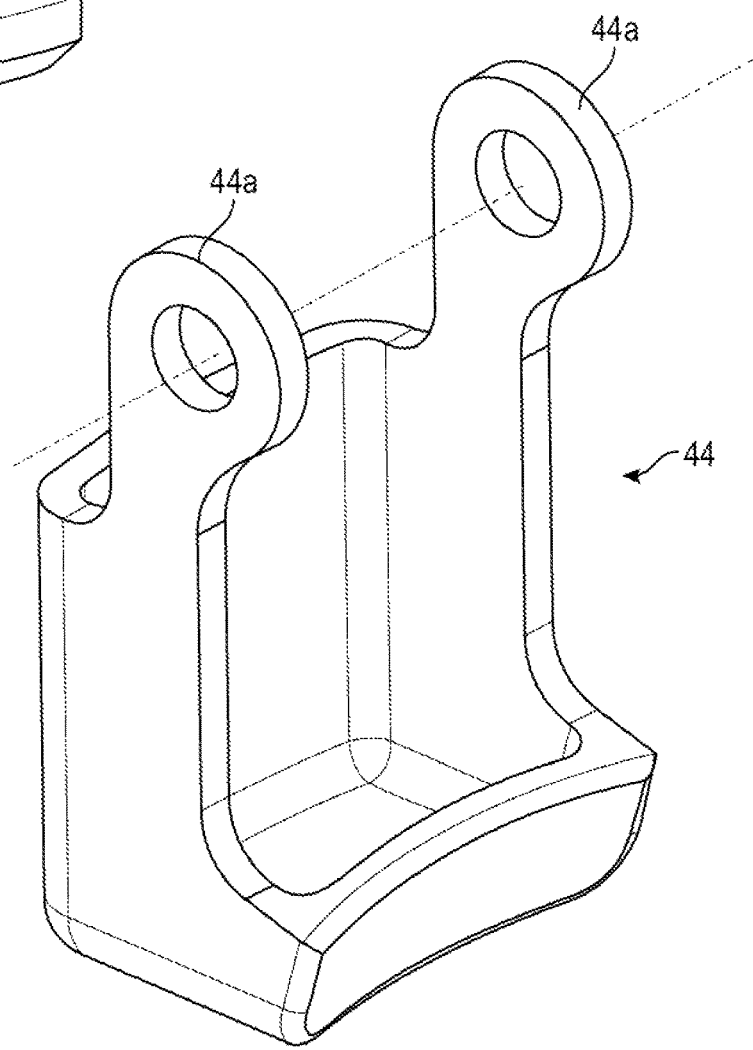
FIG. 8 is a schematic perspective view of a bolt of the system shown in FIG. 3, seen from above.

When the root 14 of the vane 10 is mounted in the ring 38, the lower bearing surface 32a of the bulb 32 is supported axially on the wall 74. Due to the frustoconical shape of this wall 74 in the example shown, it is understood that this bearing has at any point an axial component and a radial component with respect to the axis A.

Where the lower end of wall 72 joins the external periphery of the wall 74, the ring 38 comprises an annular bearing surface 75 (FIGS. 3 and 6).

At its upper end, the wall 72 comprises a thread 78 for screwing on the nut 42. This thread 78 is located at the external periphery of the ring 38 and more particularly at the external periphery of the free upper end of the ring 38.

FIG. 6 shows that this free upper end of the ring 38 comprises an annular toothing 80 which is configured to cooperate with a tool (not shown) for driving the ring 38 in rotation about the axis A.

FIG. 6 also shows that the ring 38 can comprise, at the upper end of the wall 72 and at its internal periphery, elements 82 for attaching the bolt 44. These attachment elements 82 may take the form of two tabs arranged on either side of one of the openings 76, at the upper end of it. The tabs are parallel to each other and to the axis A and each comprises an orifice for mounting a screw or a bolt 84 (see FIGS. 13-14). The orifices in the tabs are substantially aligned and extend in a plane perpendicular to the axis A.

As can be seen in FIG. 3, the ring 38 is mounted in the hub 36 so that its walls 72, 74 are located in the hub 36 and its free upper end is located just above the upper end 36c of the hub 36 and of its surface 36c1.

The nut 42 comprises an internal thread and can be screwed, or at least pre-screwed, onto the thread 78 of the ring 38, preferably before it is inserted into the hub 36. The nut 42 can rest axially on the surface 36c1 of the hub 36.

The pre-tightening of the nut 42 on the ring 38 can allow the nut 42 to come to bear axially on the surface 36c1 in order to prevent that the lower wall 74 of the ring 38 comes into contact with the hub 36 and its bottom wall 36b, when the ring 38 is inserted. However, preferably, the aforementioned bearing surface 75 of the ring 38 is configured to come into contact with the hub 36 in order to avoid this axial bearing of the nut 42 on the surface 36c1.

When the ring 38 is inserted into the hub 36, the intermediate wall 72, and in particular the radially external surfaces of the aforementioned columns 72a, can cooperate by sliding with the internal cylindrical surfaces 60a, 62a of the ribs 60, 62, in order to carry out a centering and a guiding of the ring 38 in the hub 36.

FIGS. 3 and 9 to 14 show that the nut 42 may comprise at its upper end an annular toothing 81 which is configured to cooperate with a tool (not shown) for driving the nut 42 in rotation about the axis A. It can be seen that the toothings 80, 81 are similar.

The number of abutments 40 is at most equal to the number of openings 76 in the ring 38. In the example shown, the number of abutments 40 is equal to the number of openings 76 minus one, because one of the abutments 40 is replaced by the bolt 44. The number of abutments 40 is between 5 and 20, and preferably between 7 and 11. It is 9 in the example shown. This means that there are nine openings 76 in the ring 38.

The abutments 40 are arranged around the axis A and are mounted around the root 14 and in the hub 36. These abutments 40 are engaged in the openings 76 and in at least one of the housings 64, 66, 68, and are designed to bear on the upper bearing surface 32b of the bulb 32 of the root 14, at least in the axial direction.

Each of the abutments 40 comprises a bearing face 40a on the upper bearing surface 32b of the bulb 32 of the root. This bearing face 40a is shaped so that the nearing has at any point an axial component and a radial component with respect to the axis A.

In addition, each of the abutments 40 comprises at least one finger projecting radially outwards with respect to the axis A and comprises two such fingers 86, 88 in the example shown. The fingers 86, 88 are preferably spaced apart and arranged one above the other. It is understood that one of the fingers 86 is intended to be engaged in the housing 64, the other of the fingers 88 being intended to be engaged in the housing 68 in the example shown in FIG. 3.

Each abutment 40 comprises an upper finger 86 which comprises an upper face 86a, a lateral face 86b and a lower face 86c. The faces 86a and 86b are complementary to the surfaces 60b, 64a and are configured to bear against these surfaces, in the axial and radial directions respectively, when the abutment 40 is mounted, as can be seen in FIG. 3a. The face 86c and the surface 62c may be complementary but may be separated by a clearance during the assembly or after tightening the nut 42.

Each abutment 40 comprises a lower finger 88 which comprises an upper face 88a, a lateral face 88b and a lower face 88c. The face 88b is complementary to the surface 68a and is configured to come to bear on this surface 68a, in the radial direction, when the abutment 40 is mounted, as can be seen in FIG. 3a. The face 88a and the surface 62b may be complementary but may be separated by a clearance during the assembly or after tightening the nut.

The lower finger 88 of each abutment 40 is therefore not intended to bear axially on the lower rib 62, due to the presence of this clearance. If the abutment 40 breaks, its lower finger 88 can come to bear axially on the lower rib 62, which ensures the radial retention of the vane 10 and forms the aforementioned failsafe function.

Advantageously, the clearance at the level of the lower finger 88 of each abutment 40 is sufficient for the imbalance generated by the displacement of the vane 10 to be detected in the event of the upper finger 86 of one or more abutments 40 breaking.

The abutments 40 are intended to be mounted in the openings 76 and in the housings 64, 68 one after the other, by means of the notch 70 formed in the ribs 60, 62. The dimensions of the abutments 40 are therefore such that they can be engaged in the openings 76, preferably in an adjusted manner, as well as in the notch 70.

Figure 9:
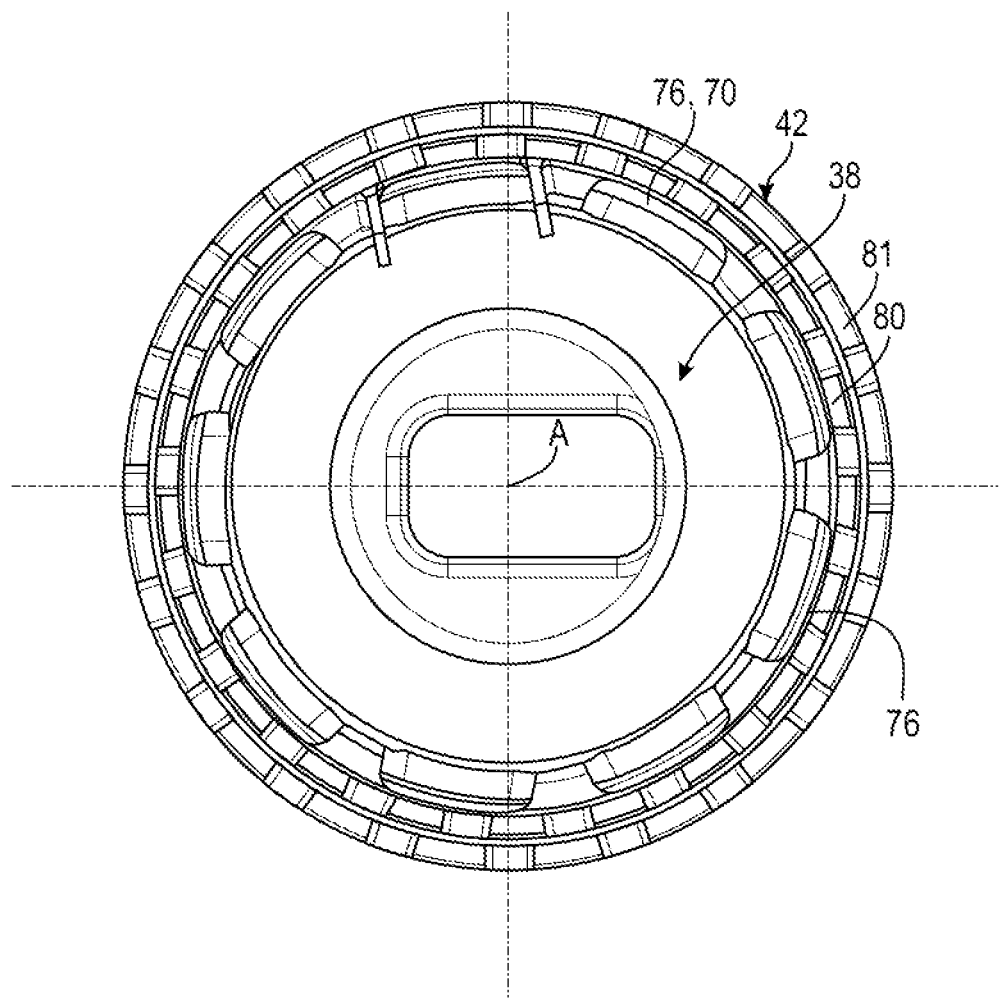
FIG. 9 is a schematic view of the hub and the ring assembled in the hub of the system of FIG. 3, seen from above, and illustrates a step in an assembly method according to the disclosure.
Figure 10:
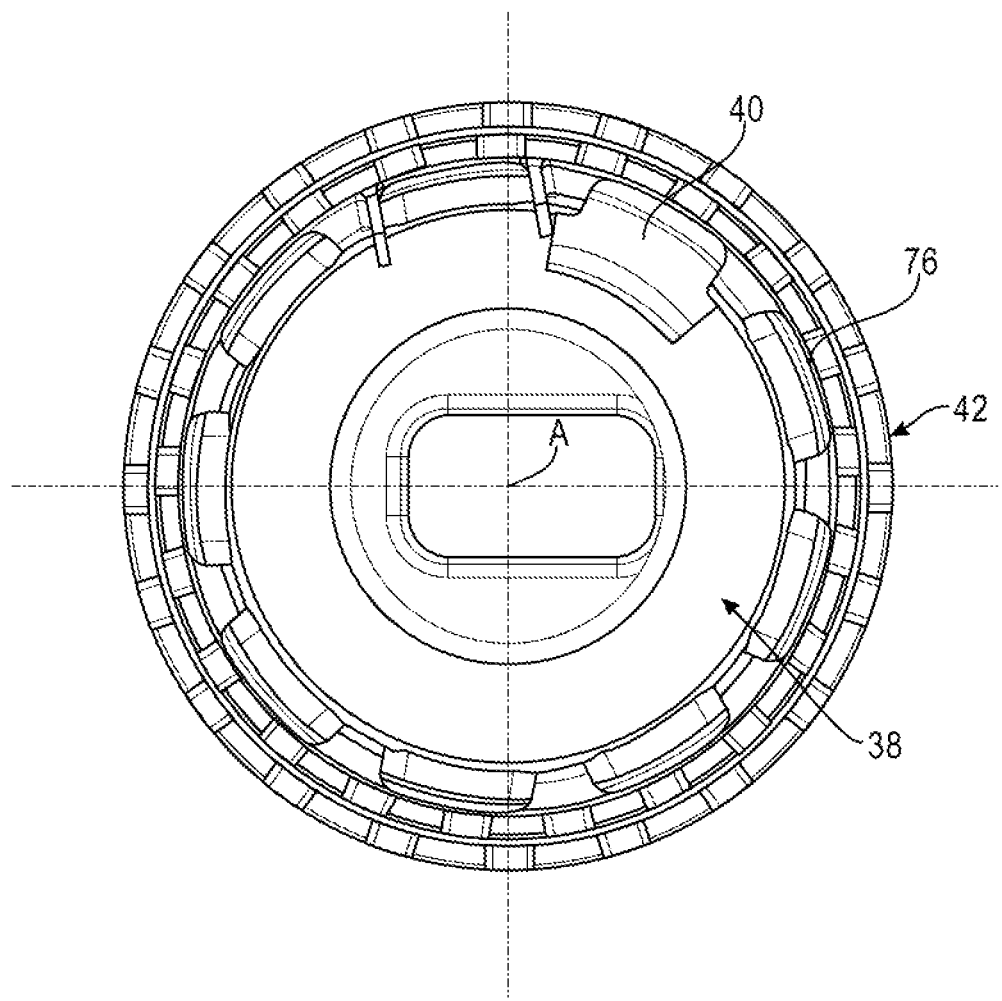
FIG. 10 is a schematic view of the hub, of the ring and of an abutment, seen from above, and illustrates another step in the method.
Figure 11:
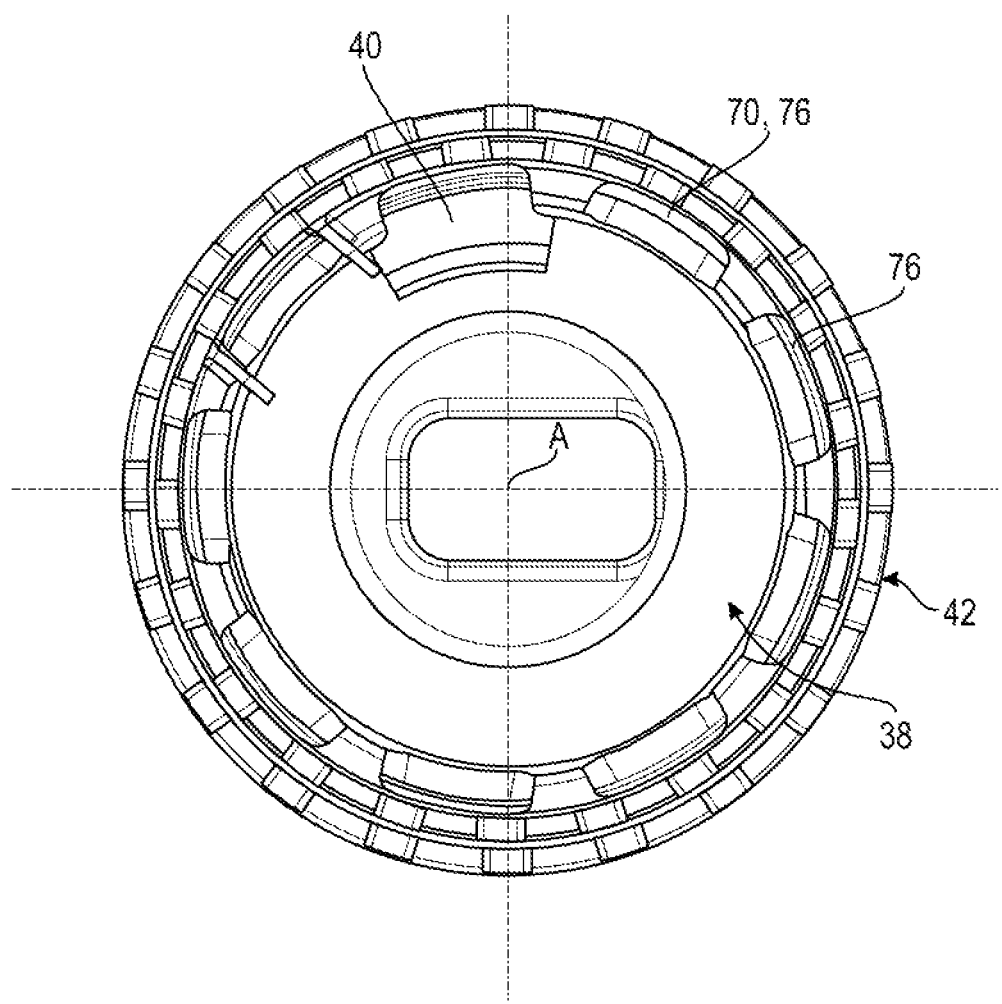
FIG. 11 is a similar view to FIG. 10 and illustrates another step in the method.
Figure 12:
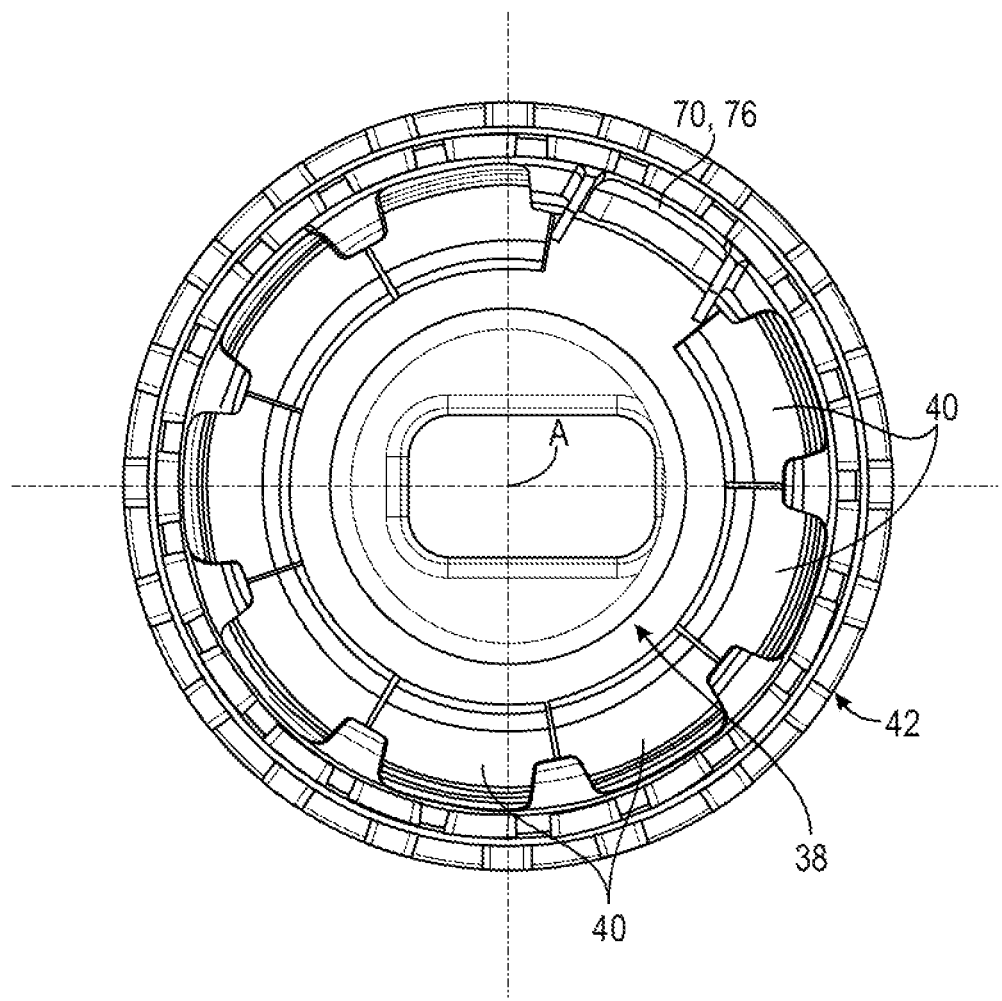
FIG. 12 is a schematic view of the hub, of the ring and of abutments, seen from above, and illustrates another step in the method.
Figure 13:
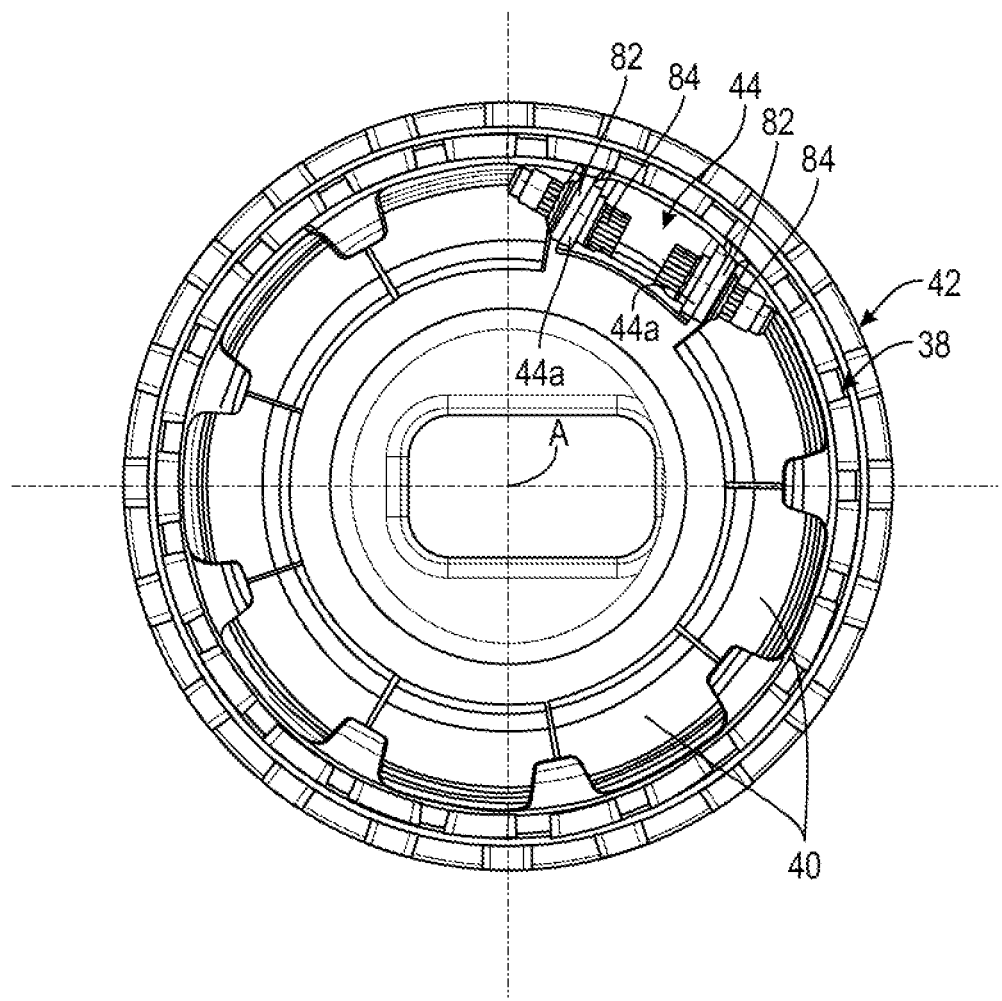
FIG. 13 is a schematic view of the hub, of the ring, of the abutments and of a bolt, seen from above, and illustrates another step in the method.
Figure 14:
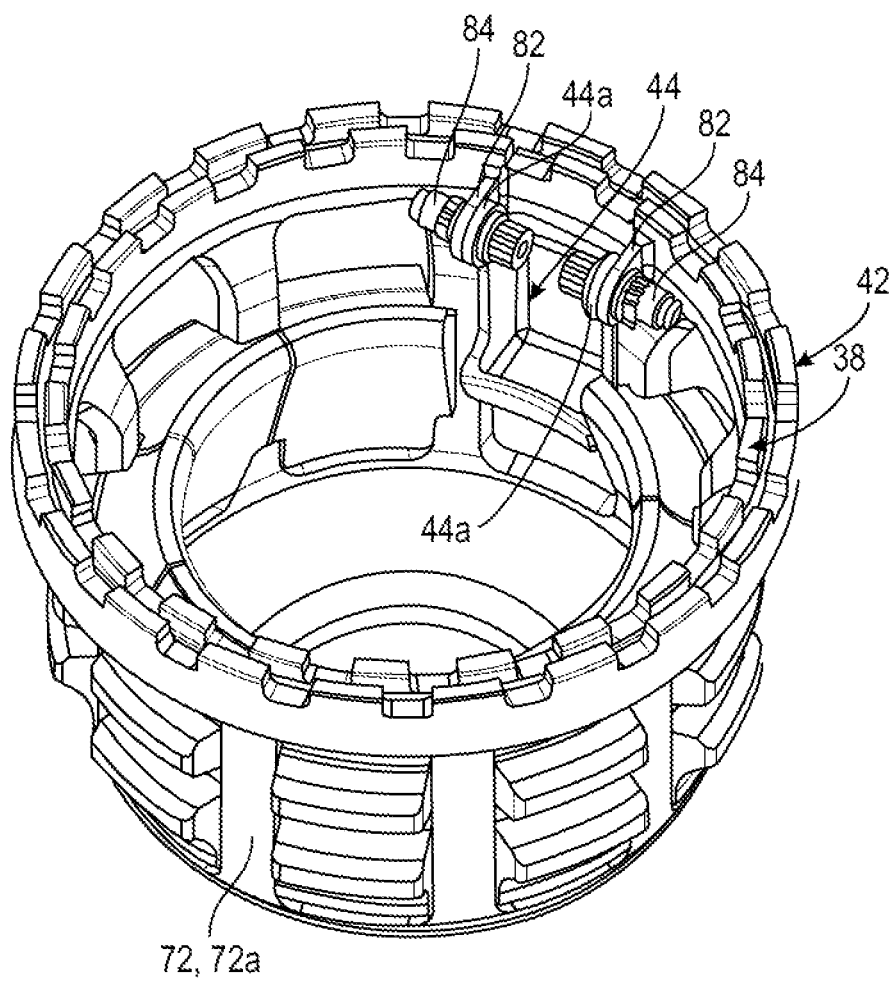
FIG. 14 is a schematic perspective view of the ring, the abutments and the bolt, without the hub.

To do this, as shown in FIG. 9, one of the openings 76 must be axially aligned with the notch 70. A first abutment 40 is then inserted by axial translation from top to bottom into this opening 76 and the notch 70 so that the upper finger 86 is located in a plane perpendicular to the axis A which passes through the housing 64, and the lower finger 88 is located in a plane perpendicular to the axis A which passes through the housing 68 (FIG. 10). As a result of the cooperation by circumferential abutment between the sides of the abutment 40 and the columns 72a of the ring 38, the abutment 40 is secured against rotation to the ring 38. It is therefore understood that by rotating the ring 38 in the hub 36, using the aforementioned tool, the abutment 40 can be moved about the axis A away from the notch 70 (FIG. 11). The other abutments are mounted in the same way in the openings 76 in the ring 38 and in the housings 64, 68 (FIG. 12).

Figure 15:
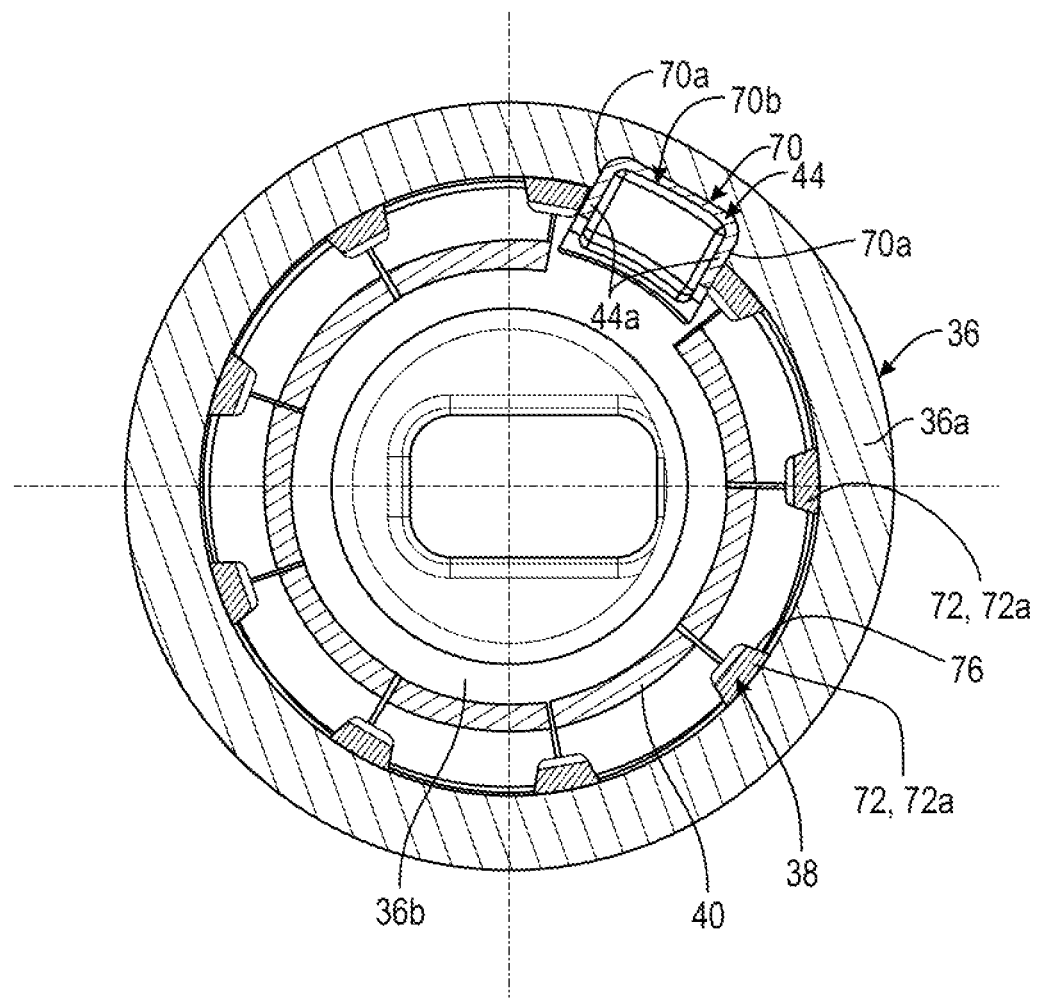
FIG. 15 is a schematic cross-sectional view of the assembly shown in FIG. 13.

The bolt 44 is designed to be mounted in the last free opening 76 in the ring 38, after the abutments 40 have been mounted (FIGS. 12 to 15). It is also designed to be mounted in the notch 70 in the ring 38. It is configured and in particular dimensioned to be mounted in the notch 70 so that its sides can cooperate by circumferential abutment with the side walls 70a of the notch 70. FIG. 15 also shows that the bolt 44 is intended to be pressed radially against the bottom wall surface 70b of the notch 70.

The bolt 44 is here configured to be attached to the ring 38 and comprises, in the example shown, lateral tabs 44a positioned on the tabs 82 of the ring 38. The tabs 44a comprises orifices aligned with the orifices in the tabs and intended to receive the bolts 84. The bolt 44 is attached to the ring 38 so that they cannot move relative to each other. In addition, the engagement of the bolt 44 in the notch 70 allows to prevent the ring 38 from rotating in the hub 36.

Once the bolt 44 has been mounted, the ring 38 can no longer be moved in the hub 36. The position of the bolt 44 around the root 14 of the vane 10 can be selected. It is advantageous to position it on the side of the suction side 12b of the blade 12 of the vane 10, and closer to the trailing edge 12d of the blade than to its leading edge 12c.

Once the bolt 44 has been mounted, the nut 42 can be screwed on further and, in particular, the nut 42 can be tightened on the surface 36c1 in such a way as to force it:
  the bearing of the lower wall 74 of the ring 38 on the lower bearing surface 32a of the bulb 32 of the root 14,
  the bearing of the upper bearing surface 32b of this bulb 32 on the faces 40a of the abutments 40, and
  the bearing of these abutments 40 on the surfaces 60b, 64a and 68a of the housings 64, 68 of the hub 36.

Figure 16:
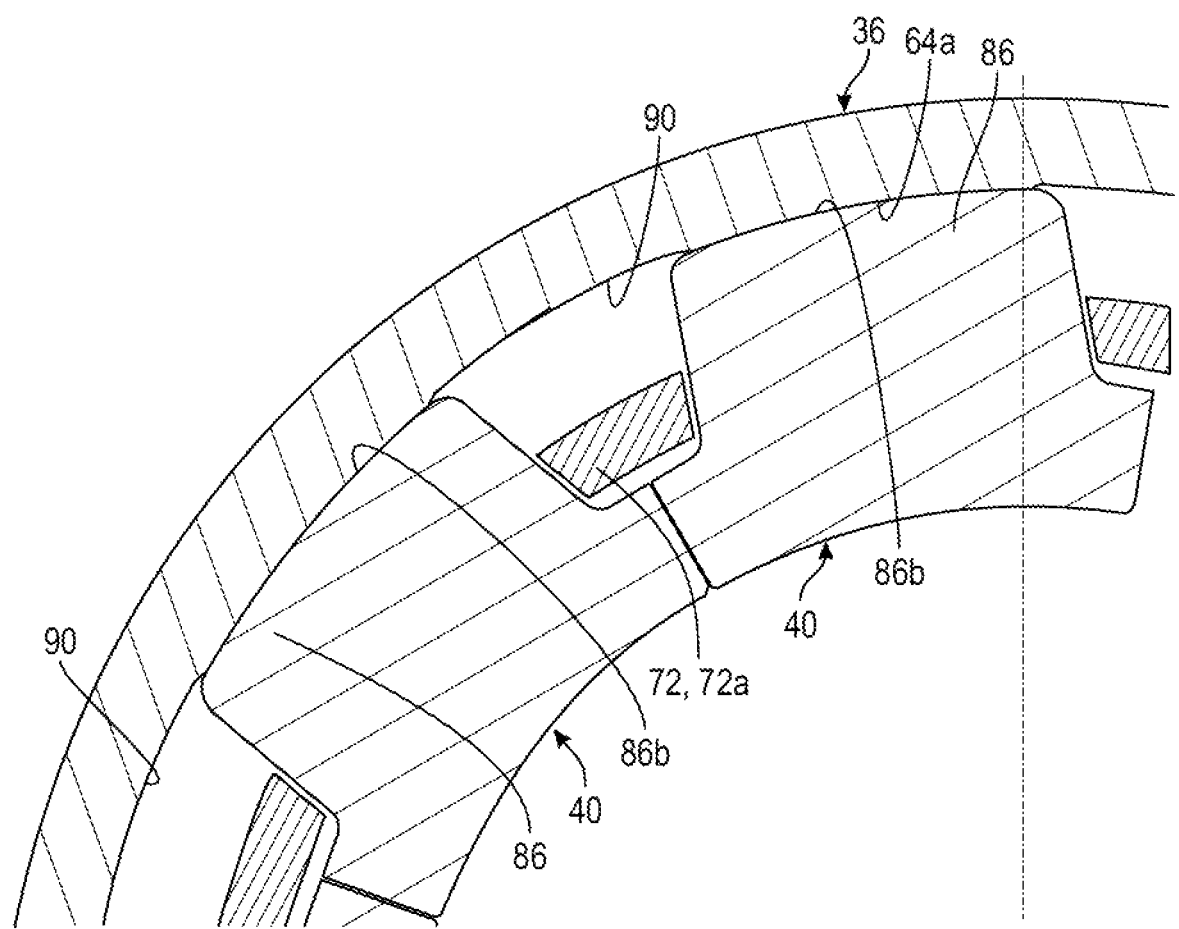
FIG. 16 is a larger-scale detail view of a portion of FIG. 15.

FIG. 16 shows that discharge grooves 90 can be formed on the surface 64a of the hub 36, opposite each of the columns 72. These grooves 90 create discontinuities in the internal cylindrical surface 64a of the hub 36.

FIG. 3a shows that discharge slots 92 can be provided at the level of the connections between the surfaces 60b and 64a, between the surfaces 64a and 62c, and/or between the surfaces 62b and 68a, so that the connection radii allow the forces and the mechanical stresses to be distributed more evenly during operation. In this way, the contact surfaces 60b, 64a, 68a of the hub 36 are always slightly smaller than the faces 86a, 86b, 88b of the opposing abutments 40. This means that there is no local peak force at the end of the bearing surface on the hub 36 (radial and axial support).

Figure 17:
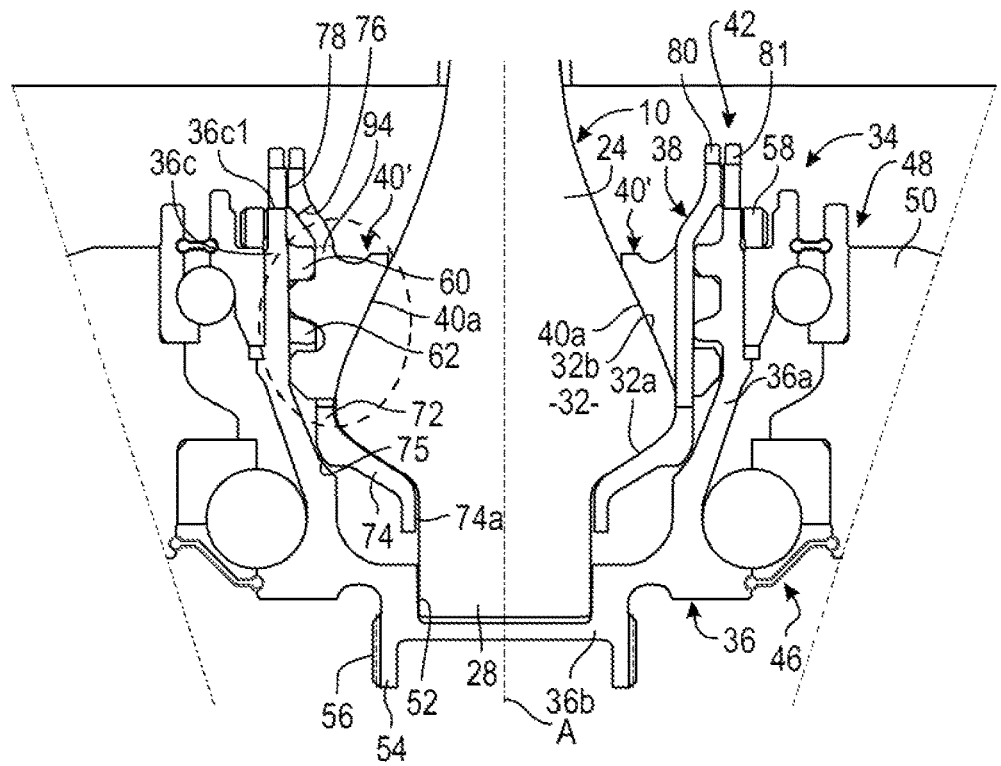
FIG. 17 is a schematic view in axial cross-section of a system according to the disclosure for the angular pitch setting of a turbine engine propeller vane, according to an alternative embodiment of the disclosure.
Figure 17A:
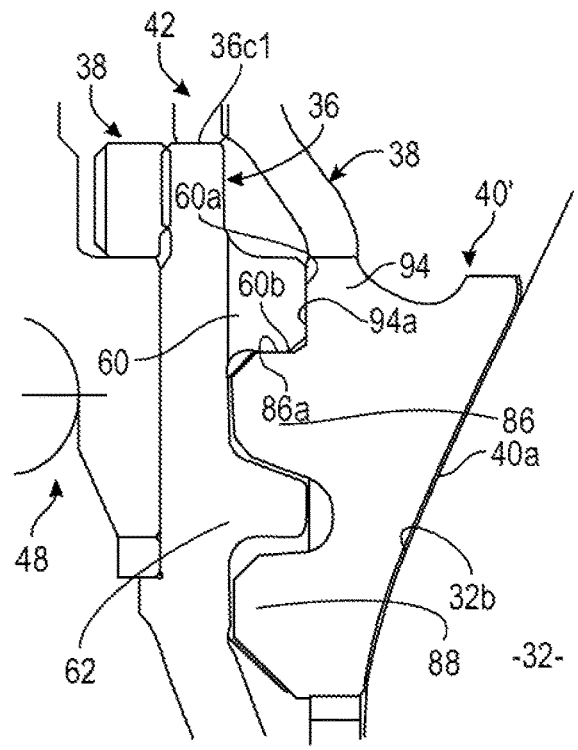
FIG. 17a is a larger scale detail view of a portion of FIG. 17.

FIGS. 17 and 17a show a variant embodiment of the system 34 and in particular of the abutments 40', which here also comprise an additional finger 94 which extends axially on the side of the blade 12 of the vane 10 in the assembly position, and which comprises a radially outwardly bearing lateral face 94a.

As can be seen in FIG. 17a, when the abutments 40' are mounted, the faces 86a are intended to be applied axially to the surface 60b of the rib 60, and the faces 94a are intended to be applied axially to the surface 60a of the same rib 60. The other faces of the abutments 40' are separated by clearances from the surfaces facing the hub 36.

This variant allows to limit the stresses in the hub 36 and ensures that it is robust. It differs from the initial solution in that the abutments 40' are not centered in the hub 38 on their largest outer diameter, but on the inner diameter of the upper finger 86 of the hub 36.

The radial bearing (expansion work) of the abutments 40' is on the inner diameter of the upper rib 60. In this way, the area of the hub 36 working in tension (holding the vane 10 centrifugally) is not exposed to this force. In addition, because the radial bearing is on a thicker portion of the hub 36, the deformation of the hub 36 is reduced to the benefit of the operation of the upper bearing 48.

The axial bearing of the abutments 40' is on the lower surface 60b of the upper rib 60 of the hub 36, isolating the critical area of this bearing from the critical tensile area of the hub 36 by a sufficient distance.

The present disclosure also relates to a method for mounting a system 34 as described in the foregoing, which comprises the steps of:
  a) inserting the ring 38 into the hub 36,
  b) inserting the root 14 of the vane 10 into the ring 38, until the lower bearing surface 32a of the bulb 32 of the root 14 bears on the lower wall 74 of the ring 38,
  c) engaging the abutments 40, 40' in the openings 76 in the intermediate wall 72 of the ring 38 and of their fingers 86, 88 in the housings 64, 68 in the hub 36, and
  d) screwing the nut 42 onto the ring 38 and tightening the nut 42 on the hub 36, and in particular on the surface 36c1, so as to force the lower wall 74 of the ring 36 to bear on the lower bearing surface 32a of the bulb 32 of the root 14, the upper bearing surface 32b of this bulb 32 to bear on the abutments 40, 40', and these abutments 40, 40' to bear on the surfaces 60b, 64a, 68a or 60a, 60b of the ribs of the hub 36.

As mentioned above, step c) preferably comprises the following successive sub-steps:
  c1) engaging one of the abutments 40, 40' in one of the openings 76 in the intermediate wall 72 of the ring 38, by moving the abutment 40, 40' in axial translation through the notch 70 in the hub 36,
  c2) moving in rotation the ring 38 and the abutment 40, 40' inside the hub 36, about the axis A, c3) engaging another of the abutments 40, 40' in one of the openings 76 in the intermediate wall 72 of the ring 38, by moving the abutment 40, 40' in axial translation through the notch 70 in the hub 36, c4) moving in rotation the ring 38 and the abutments 40, 40' inside the hub 36, about the axis A, c5) repeating steps c3) and c4) for the remaining abutments 40, 40', c6) engaging the bolt 44 in the last free opening 76 in the intermediate wall 72 of the ring 38, by moving the bolt 44 in axial translation through the notch 70 in the hub 36, and c7) attaching the bolt 44 to the ring 38.

It is thus understood that the abutments 40, 40' are mounted one after the other by a positive-clutch assembly in the hub 36. It is also understood that the abutments 40, 40' are mounted one after the other in the hub 36 in the same way as balls are loaded into the rotating barrel of a firearm, the hub 36 here forming the barrel.

In each of steps c2) and c4), the ring 38 is preferably moved by one circumferential pitch, this circumferential pitch being equal to 360°/k, k being the number of openings 76 in the intermediate wall 72 of the ring 38. In the aforementioned particular case where k is equal to 9, it is therefore understood that the circumferential pitch represents 40° around the axis A.

Other variant embodiments not shown are possible, including:
- the bolt 44 can be replaced by a device for locking and blocking in rotation between the ring 38 and the hub 36, located for example between the upper free ends of the ring 38 and of the hub 36;
- the bolt 44 could also be configured to bear on the vane root 14 with a view to participating in its retention and to participating in taking up the forces on the vane in operation, which is not the case in the previous embodiments; the bolt 44 could thus be formed by one of the abutments 40, 40' which would be associated with means for attaching to the ring 38 and/or to the hub 36.

The present disclosure has many advantages, including:
- a quick and easy assembly of the system so that the vane 10 can be replaced without disassemble the engine or the hub 36;
- a highly secure and robust solution:
  - if the upper rib of the hub 36 breaks, the vane 10 is retained by the lower rib 62 (failsafe) and the upper end 36c of the hub 36 is additionally retained by the nut 42;
  - in the event of breakage of all the columns 72a of the ring 38, the vane 10 remains held by the upper rib 60 (without pre-tightening) and the upper end of the ring 38 remains trapped around the vane root 14;
  - if one of the abutments 40, 40' breaks, there are still enough abutments to retain the vane 10 (redundancy);
- the design details (slots 90, 92 and discharge grooves, for example, positioned) contribute to the robustness of the assembly;
- the vane 10 is well held in all operating phases.

The invention claimed is:

1. A system for controlling a pitch setting of a propeller vane for an aircraft turbine engine, comprising:
   - a vane comprising a blade connected to a root, the vane comprising a pitch axis and the root comprising a bulb which has a lower bearing surface and an upper bearing surface, both of which extend around said axis,
   - a hub comprising an annular wall extending about said axis, the annular wall comprising a lower axial end closed by a bottom wall and an upper axial end open and configured to allow the root of the vane to be mounted inside the hub, the bottom wall comprising a recess having a non-circular cross-section and configured to receive a free end of complementary shape to said root so that the hub is secured in rotation to the root about said axis,
   - a ring which extends around said axis and which is mounted around the root and in the hub, the ring comprising a lower wall which is located in the hub and which comprises an aperture through which said free end of the root passes, said lower bearing surface of the bulb of the root being configured to bear at least in an axial direction on the lower wall, on the side opposite the blade of the vane, the ring further comprising a perforated intermediate wall and a thread at an upper end,
   - abutments which are arranged around said axis and which are mounted around the root and in the hub, the abutments being engaged in openings in said intermediate wall and in at least one housing of the annular wall of the hub, said upper bearing surface of the bulb of the root being configured to bear at least in the axial direction on these abutments, on the same side as the blade of the vane, and
   - a nut in threaded engagement with the thread of the ring and configured to bear axially on said hub so that tightening the nut forces the lower wall of the ring to bear on the lower bearing surface of the bulb of the root, the upper bearing surface of the bulb to bear on the abutments, and the abutments to bear on complementary support surfaces of said at least one housing of the hub.

2. The system according to claim 1, wherein a number of said abutments is less than or equal to a number of said openings in the intermediate wall of the ring, each of the abutments being engaged in one of these openings.

3. The system according to claim 2, wherein the number of said abutments is between 5 and 20.

4. The system according to claim 1, wherein the lower wall of the ring has a frustoconical shape flared towards the blade so that the bearing of the lower bearing surface of the bulb of the root on the lower wall has at every point an axial component and a radial component with respect to said axis.

5. The system according to claim 1, wherein each of the abutments comprises a bearing face on the upper bearing surface of the bulb of the root, the bearing face being shaped so that the upper bearing has at any point an axial component and a radial component with respect to said axis.

6. The system according to claim 1, wherein the nut is threadedly engaged with an outside of the ring and/or bears axially on an upper free end of the hub.

7. The system according to claim 1, wherein each of the abutments comprises at least one finger projecting radially outwards with respect to said axis, said at least one finger comprising an upper face bearing axially on a corresponding support surface of said at least one housing.

8. The system according to claim 7, wherein said at least one finger further comprises a lateral face bearing radially outwards on a corresponding support surface of said at least one housing.

9. The system according to claim 7, wherein said at least one finger comprises two fingers projecting radially outwards with respect to said axis and arranged axially one behind the other.

10. The system according to claim 1, wherein the hub comprises at least one annular rib which extends around said axis and which defines said at least one housing for engaging said abutments, the rib comprising at least one axial notch configured to allow the abutments to be mounted one after the other.

11. The system according to claim 10, wherein the hub further comprises an upper annular rib and a lower annular rib, each of the first and second annular ribs extending around said axis the first and second annular ribs defining therebetween said at least one housing for engaging said abutments, the first and second annular ribs comprising at least one axial notch configured to allow the abutments to be mounted one after the other.

12. The system according to claim 10, further comprising at least one bolt which is engaged in one of the openings of the ring and in said at least one notch, said at least one bolt being attached to said ring.

13. The system according to claim 12, wherein the at least one bolt is attached by one or more screws to the ring.

14. The system according to claim 12, wherein said at least one bolt is located on a side of a suction side of the blade of the vane, and is closer to a trailing edge of the blade than to a leading edge of the blade.

15. The system according to claim 12, wherein, before mounting the at least one bolt, the ring is able to move in rotation about said axis in the hub, and after mounting the at least one bolt, the ring is prevented from rotating about this axis by circumferential abutment of the at least one bolt on sides of the at least one axial notch.

16. A turbine engine, comprising at least one system according to claim 1.

17. A method for mounting the system according to claim 1, the method comprising the steps of:
a) inserting the ring into the hub,
b) inserting the root of the vane into the ring until the lower bearing surface of the bulb of the root bears on the lower wall of the ring,
c) engaging the abutments in the openings in the intermediate wall of the ring and in said at least one housing of the hub, and
d) threadedly engaging the nut with the ring and tightening the nut on the hub to force the lower wall of the ring to bear on the lower bearing surface of the bulb of the root, the upper bearing surface of this bulb to bear on the abutments, and these abutments to bear on the complementary support surfaces of said at least one housing of the hub.

18. A method for mounting the system according to claim 15, the method comprising the steps of:
a) inserting the ring into the hub,
b) inserting the root of the vane into the ring until the lower bearing surface of the bulb of the root bears on the lower wall of the ring,
c) engaging the abutments in the openings in the intermediate wall of the ring and in said at least one housing of the hub, wherein step c) comprises the following successive sub-steps:
c1) engaging a first abutment of the abutments in one of the openings in the intermediate wall of the ring, by moving the first abutment in axial translation through the at least one axial notch in the hub,
c2) moving in rotation the ring and the first abutment inside the hub, about the axis,
c3) engaging a second abutment of the abutments in one of the openings in the intermediate wall of the ring, by moving the second abutment in axial translation through the at least one axial notch in the hub,
c4) moving in rotation the ring and the second abutments inside the hub, about the axis,
c5) repeating steps c3) and c4) for the remaining abutments of the abutments,
c6) engaging the at least one bolt in a last free opening in the intermediate wall of the ring, by moving the at least one bolt in axial translation through the at least one axial notch in the hub, and
c7) attaching the at least one bolt to the ring, and
d) threadedly engaging the nut with the ring and tightening the nut on the hub to force the lower wall of the ring to bear on the lower bearing surface of the bulb of the root, the upper bearing surface of this bulb to bear on the abutments, and these abutments to bear on the complementary support surfaces of said at least one housing of the hub.

19. The method according to claim 18, wherein the ring is moved by one circumferential pitch in each of steps c2) and c4), the circumferential pitch being equal to 360°/k, k being a number of said openings in the intermediate wall of the ring.

* * * * *